F. AHLBURG.

TEMPERATURE CONTROL SYSTEM.

APPLICATION FILED MAR. 7, 1919.

Reissued July 15, 1919.

14,685.

2 SHEETS—SHEET 1.

WITNESSES:

J. A. Helsel.

H. M. Biebel

INVENTOR

Frank Ahlburg.

BY

Wesley Gloar

ATTORNEY

F. AHLBURG.

TEMPERATURE CONTROL SYSTEM.

APPLICATION FILED MAR. 7, 1919.

Reissued July 15, 1919.

14,685.

2 SHEETS—SHEET 2.

WITNESSES:

J. A. Helsel.

H M Biebel

INVENTOR

Frank Ahlburg.

BY

Wesley G. Carr

ATTORNEY

UNITED STATES PATENT OFFICE.

FRANK AHLBURG, OF SAN FRANCISCO, CALIFORNIA, ASSIGNOR, BY MESNE ASSIGNMENTS, TO WESTINGHOUSE ELECTRIC & MANUFACTURING COMPANY, A CORPORATION OF PENNSYLVANIA.

TEMPERATURE-CONTROL SYSTEM.

14,685. Specification of Reissued Letters Patent. Reissued July 15, 1919.

Original No. 1,256,969, dated February 19, 1918, Serial No. 59,581, filed November 4, 1915. Application for reissue filed March 7, 1919. Serial No. 281,294.

*To all whom it may concern:*

Be it known that I, FRANK AHLBURG, a citizen of Germany, and a resident of San Francisco, in the county of San Francisco and State of California, have invented a new and useful Improvement in Temperature-Control Systems, of which the following is a specification.

The invention relates to a system of controlling the temperature of a plurality of electrically heated devices.

An object of the invention is to provide means for maintaining electrically heated devices at a substantially constant temperature regardless of voltage variations of the supply current.

Another object of the invention is to provide means for maintaining a plurality of electrically heated devices at a substantially constant predetermined temperature.

The invention possesses other advantageous features, some of which, with the foregoing, will be set forth at length in the following description, where I shall outline in full that form of the invention which I have selected for illustration in the drawings accompanying and forming part of the present specification. In said drawings, I have shown only one specific form of my generic invention, but it is to be understood that I do not limit myself to such form, because my invention may be embodied in a plurality of forms, each being a species of my said invention.

My invention relates particularly to means for maintaining a plurality of electrically heated devices at a substantially constant temperature, preferably a predetermined temperature. The line voltage is subject to variations which vary the heating effect of a current passing through a given resistance. If a predetermined resistance is selected, which when employing current of 110 volts will produce a predetermined temperature, a variation in the voltage will produce a variation in the temperature. In accordance with my invention I select a resistance element which, if the voltage remained normal, would produce a temperature which is in excess of the desired temperature, and open the circuit when the desired temperature is reached. The resistance of the heating element is such that with the minimum voltage which obtains on the supply line, sufficient heat is generated to maintain the desired temperature. Means are provided for automatically opening the circuit when the desired temperature is reached and for again closing the circuit when the temperature falls to a predetermined amount. This entails a change of temperature of several degrees between the opening and closing of the circuit, but for all practical purposes the temperature may be considered as constant.

This control system is particularly adapted for use in an apparatus for marking fruit in accordance with the process described in my United States Letters Patent Number 1,151,506 issued to me on August 24, 1915, although it is in no manner limited to use in connection with such process. In such process, a plurality of metallic dies are employed which are heated by resistance elements and the hot dies are momentarily brought into contact with the fruit. Such process must necessarily be carried out in the packing house which is usually located in the country, where variations in line voltage are frequent.

Figure 1:
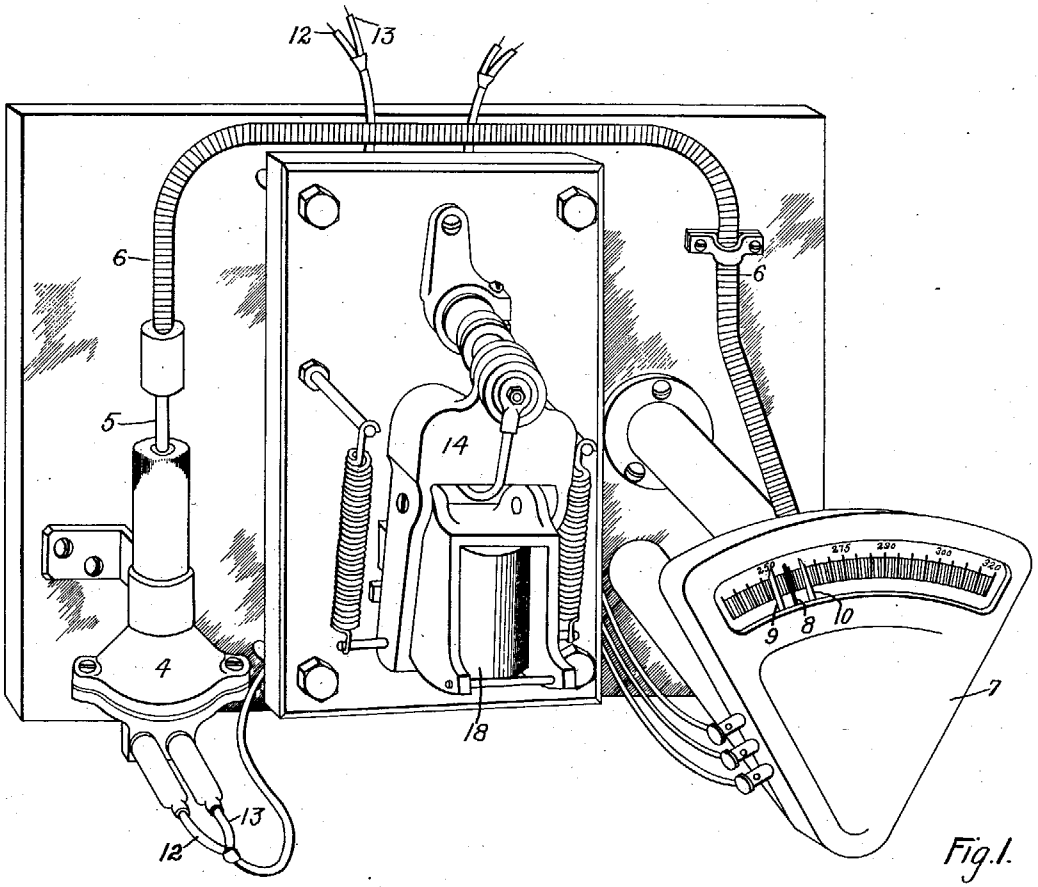
Figure 1 is a perspective view of one form of control apparatus which I may employ.
Figure 2:
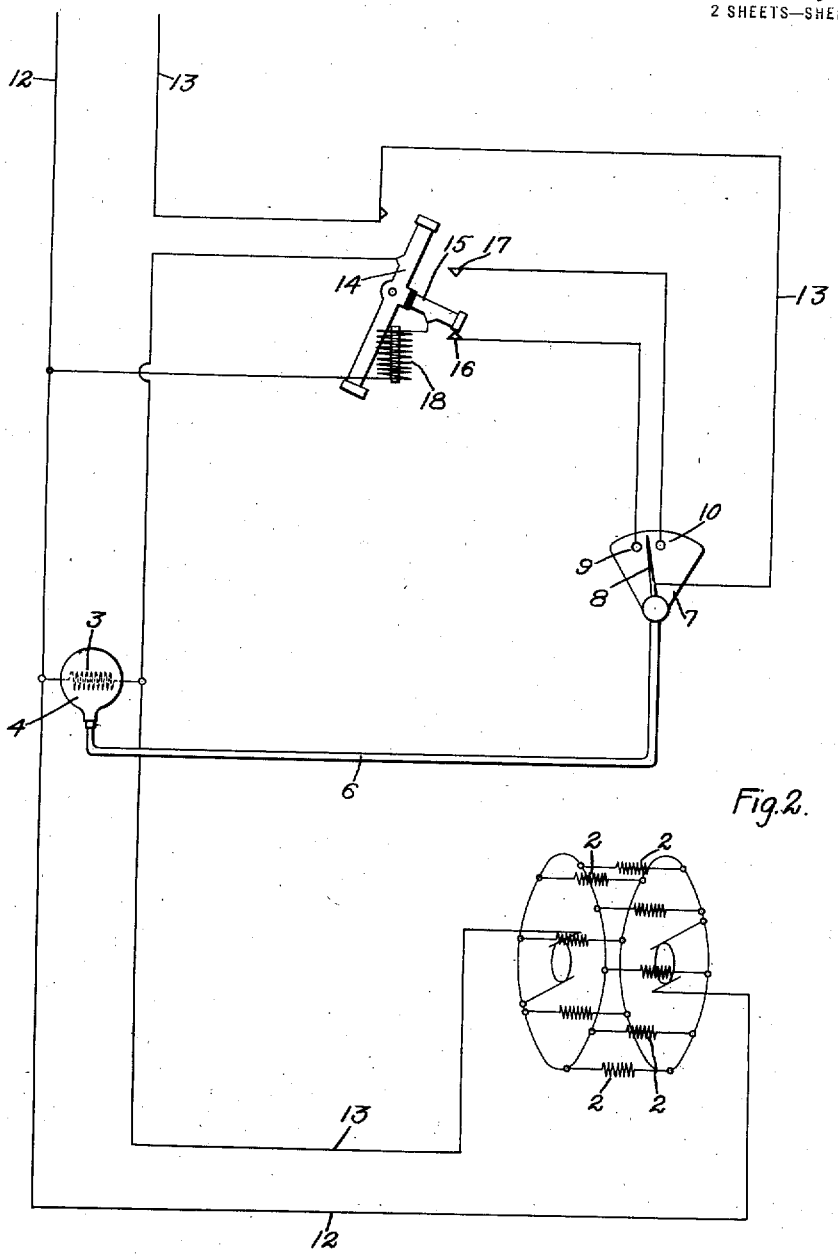
Fig. 2 is a diagrammatic representation of a control system employing the apparatus shown in Fig. 1.

The plurality of heating elements 2, which are brought into contact with the work or substance to be operated on, are arranged in parallel so that substantially the same current passes through each element, producing therein substantially the same temperature. Arranged in the circuit of the heating elements and connected in parallel therewith, at a point more or less remote therefrom, is a master heating element 3 which is inclosed in a case 4 and the heating elements 2 are inclosed in similar cases. Arranged within the case of the master element 3 is a sealed tube 5 containing a readily volatilizable liquid and this tube is connected by a closed conduit 6 to a temperature thermostat 7 having a hand 8 which is moved by variations in pressure in the tube 5. The thermostat is also provided with adjustable high and low temperature contacts 9 and 10, with which the hand or a contact carried thereby engages as the hand moves due to variations in temperature.

One side 12 of the supply line is connected directly to the heating elements and the other side 13 is connected to the heating elements through a quick throw switch 14 which is caused to operate by the contact of the hand 8 with either contacts 9 or 10.

In the present construction the switch is of the type which is operated by the magnetic effect produced by a current in the solenoid 18, one end of which is connected to the wire 12 and the other end of which is connected to an arm 15 carried by the switch arm and insulated therefrom. When the switch is in the open position the arm 15 engages a contact 16 connected to the low temperature contact 9 and when the switch is in the closed position, the arm 15 engages the contact 17 connected to the high temperature contact 10. The thermostat hand 8 is connected to the wire 13 on the line side of the switch. When the hand engages contact 9 the switch is operated to close the circuit through the heating elements and when the hand engages the contact 10, the switch is operated to open the circuit.

The resistance of the master heating element may or may not be the same as the resistance of the heating elements 2 and consequently the temperature of the master heating element may or may not be the same as the temperature of the heating elements 2. The contacts 9 and 10 are arranged so that the circuit is opened when the maximum desired temperature is obtained in the heating elements 2 and so that the circuit is closed when the minimum desired temperature is reached. The apparatus is more sensitive when the temperature of the master element is greater than the temperature of the heating elements 2, because under such conditions a variation of several degrees of temperature of the master element is accompanied by a variation of a lesser number of degrees in the heating elements.

I claim:

1. In a temperature control system, an electric heating element, a circuit connected to said element, a master heating element in said circuit out of thermal communication with said electric heating element, and means thrown into operation by variations in temperature of the master element for opening and closing said circuit.

2. In a temperature control system, a plurality of heating elements arranged to be brought into thermal contact with the work, a circuit connected to said elements and means out of thermal communication with said heating elements for controlling the current in said circuit whereby the temperature of the heating elements is maintained substantially constant at a predetermined temperature.

3. In a temperature control system, an electric circuit, a plurality of heating elements arranged in parallel in said circuit, a master heating element arranged in said circuit in parallel with said heating elements and out of thermal communication with said heating elements, and means thrown into operation by variations in temperature of the master element for maintaining the temperature of the plurality of heating elements substantially constant.

4. In a temperature control system, an electric circuit, a plurality of heating elements in said circuit of such resistance that under continuous current of normal voltage a temperature in excess of a predetermined temperature is obtained and means out of thermal communication with said heating elements, for controlling the current in said circuit so that the said predetermined temperature of the heating elements is maintained substantially constant.

5. An electrical heating system comprising a main heating element the temperature of which is to be regulated, an auxiliary heating element out of thermal communication with the main heating element, an electrical circuit from which current is supplied to both heating elements and the variations of an electrical condition of which similarly influences the temperatures of the heating elements, and means actuated in response to variations of the temperature of the auxiliary heating element for regulating the temperature of the main heating element.

6. An electrical heating system comprising a main heating element the temperature of which it to be regluated, an auxiliary heating element out of thermal communication with the main heating element, an electrical circuit from which current is supplied to both heating elements and the variations of an electrical condition of which similarly influences the temperatures of the heating elements, and means actuated in response to variations of the temperature of the auxiliary heating element for opening and closing the said circuit.

7. An electrical heating system comprising a main heating element the temperature of which is to be regulated, an auxiliary heating element out of thermal communication with the main heating element, an electrical circuit from which current is supplied to both heating elements and the variations of an electrical condition of which similarly influences the temperatures of the heating elements, and means actuated in response to variations of the temperature of the auxiliary heating element for controlling the connections of said circuit and thereby the temperature of the main heating element.

8. An electrical system comprising a main heating element the temperature of which is to be regulated, an auxiliary heating element out of thermal communication with the main heating element, an electrical circuit from which the current is supplied to both heating elements and the variations of an electrical condition of which similarly and continuously influences the temperatures of both heating elements, and means actuated in response to variations of the temperature of the auxiliary heating element for regulating the temperature of the main heating element.

In testimony whereof, I have hereunto subscribed my name this 18th day of Feb., 1919.

FRANK AHLBURG.